H. W. RICHARDSON.
Street-Sweeping Machine.
No. 203,942. Patented May 21, 1878.
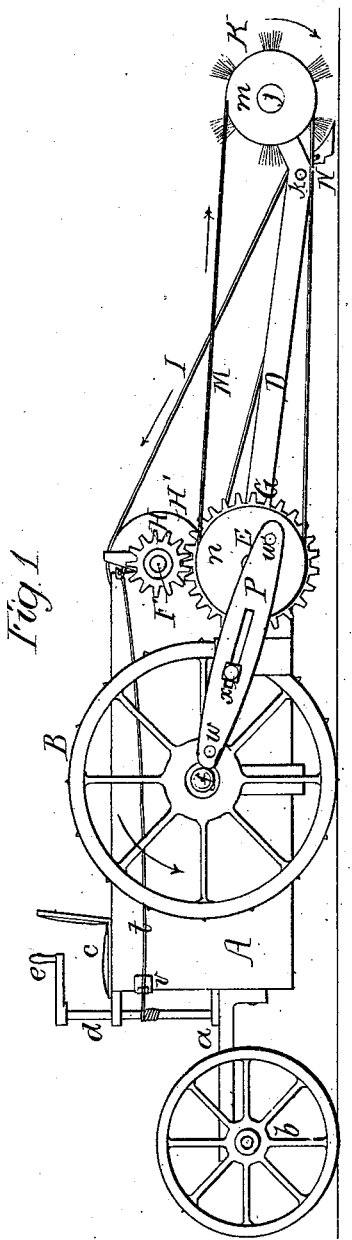
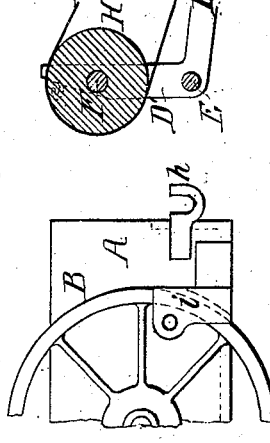
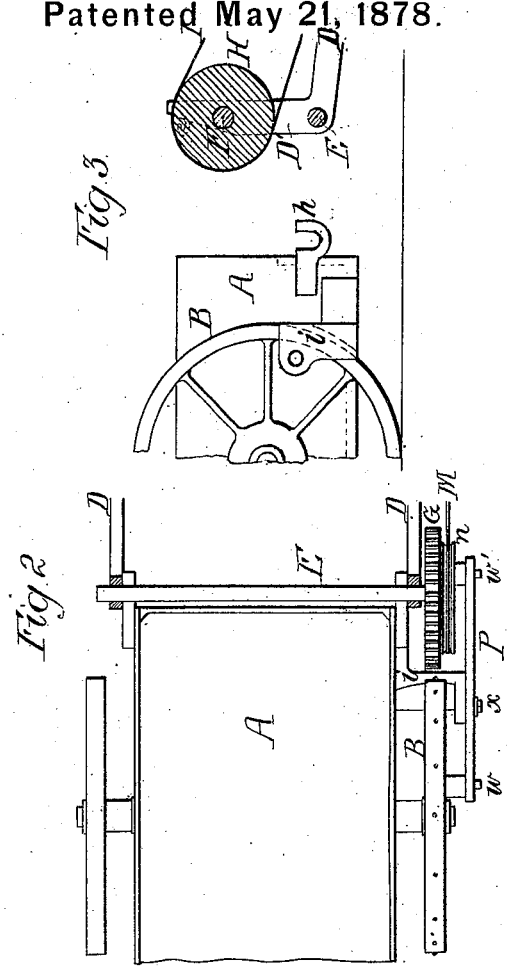
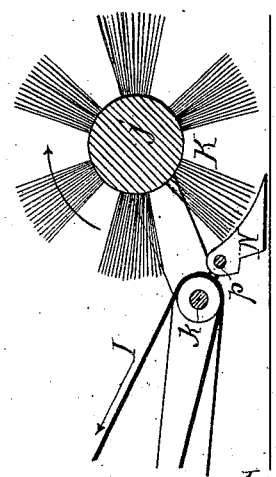
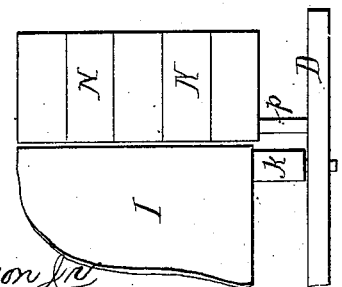
Witnesses
Henry Howson Jr
Harry Smith
Inventor
Herbert W. Richardson
by his Attorneys
Howson and son

UNITED STATES PATENT OFFICE.

HERBERT W. RICHARDSON, OF PHILADELPHIA, PENNSYLVANIA.

IMPROVEMENT IN STREET-SWEEPING MACHINES.

Specification forming part of Letters Patent No. 203,942, dated May 21, 1878; application filed October 16, 1877.

*To all whom it may concern:*

Be it known that I, HERBERT W. RICHARDSON, of Philadelphia, Pennsylvania, have invented a new and useful Improvement in Street-Sweeping Machines, of which the following is a specification:

The main object of my invention is to so combine a cart with sweeping apparatus that the latter can be readily detached from the former, thereby obviating what has been heretofore considered a necessity—namely, the carrying of the sweeping apparatus with the cart after the latter has received its load.

In the accompanying drawings, Figure 1 is a side view of my improved street-sweeping machine; Fig. 2, a plan view of part of the same; Fig. 3, a view showing the manner of connecting the sweeping apparatus to the cart; Fig. 4, a plan view of the rear end of the sweeper-frame, and Fig. 5 a vertical section of Fig. 4. Figs. 4 and 5 are drawn to a larger scale than the other figures.

My improved street-sweeper consists of two main parts—namely, first, the cart which receives the dirt, the wheels of which are the drivers of the sweeping mechanism; and, second, the sweeping apparatus, which is made detachable from the cart, this detachability being an especial feature of my invention.

The body A of the cart is a comparatively deep receptacle, preferably of quadrangular form, and has in front a projecting frame, $a$, to which is swiveled the axle carrying the leading-wheels $b$. There is also in front of the body A a driver's seat, $c$, and near the latter is a vertical shaft, $d$, adapted to bearings on the body, and provided with a handle, $e$, within reach of the driver, this shaft and its handle serving as a windlass, for a purpose rendered apparent hereinafter.

The body of the cart is fitted and secured to an axle so cranked that the journals $f$ project from the body at points so far above the bottom of the same that the driving-wheels B shall be sufficiently large in diameter, while the body of the cart is near the ground.

At the rear of the body, near the bottom of the same, are two hooked projections, $h\ h$, and on one side of the body is a projection, $i$, for a purpose hereinafter referred to.

The frame of the sweeping mechanism consists of two bars, D, suitably connected together, and having extensions D', and in the front end of this frame are the bearings for the two shafts E and F, the former having a cog-wheel, G, gearing into a pinion, H, on the shaft F.

The shaft E is arranged to fit snugly into the hooked projections $h$ at the rear of the cart-body, which thus supports the front end of the sweeper-frame.

On the shaft F is a drum, H', round which and round a roller, $k$, passes an endless apron, I, which is preferably furnished with transverse slats, the journals of the said roller $k$ turning in the bars D of the sweeper-frame, near the rear end of the same.

In this frame, near its extreme rear end, turns the shaft $j$ of the cylindrical brush K, and this shaft has a pulley, $m$, round which, and round a pulley, $n$, on the shaft E, passes a driving rope, chain, or band, M.

The rear end of the frame also carries a transverse rod, $p$, to which are hung loosely, side by side, and independently of each other, a series of fingers, N, which occupy the inclined position shown in Fig. 5, the ends of the said fingers resting on the ground when the machine is in operation.

Two ropes or chains, $t\ t$, are coiled round the windlass-shaft $d$, one cord passing over a guide-pulley, $v$, at one front corner of the cart-body and the other over a similar pulley at the other front corner of the body. One rope is connected to the upper end of the projecting arm D' of one bar, D, of the sweeping-frame, and the other rope to the projecting arm of the opposite bar of the said frame. This frame is a bell-crank lever, the fulcrum of which is in the hooked projections $h\ h$ of the cart-body, and D' D' constitute the short arms of the lever, the long arms of which carry the brush and other appliances described above, so that on turning the windlass-shaft and winding up the two ropes the rear end of the sweeper-frame will be elevated and the brush raised from the ground.

On the hub of one of the driving-wheels B is a crank-pin, $w$, and on the shaft E a similar crank-pin, $w'$, which is, in the present instance, carried by the pulley $n$, and the two crank-pins are connected together by the rod P, through a slot in which passes a fulcrum-pin, $x$, the latter being screwed into or otherwise so secured to the bracket $i$ as to be easily detached therefrom.

As the cart is drawn over the ground and the driving-wheels turn in the direction of the arrow, a combined vibrating and reciprocating motion will be communicated to the rod P, which serves, with the cranks, partly as a lever and partly as a connecting-rod to communicate the motion of the driving-wheels to the shaft E, and thereby cause the drum H and brush K to rotate and the endless apron to traverse in the directions pointed out by their respective arrows, so that the brush must sweep the dirt from the ground, first over the fingers N, and then onto the endless apron, by which the dirt is carried upward and finally discharged into the body of the cart, the rear of the latter being open for the admission of a portion of the drum H.

As before remarked, one of the most important features of my invention is the ready detachability of the sweeping apparatus from the cart, so that two or more carts can be used, one after the other, in connection with one sweeping device, the latter being detached from a loaded and connected to an empty cart, so that the sweeping operations may be continued while the said loaded cart is drawn to the place where its contents have to be dumped.

The necessity of dragging away the sweeping mechanism with the load, as in other sweeping-machines, is thus obviated.

In order to disconnect the sweeping device from the cart, but three things are necessary: first, to unhook the two ropes $t\,t$ from the arms D' of the sweeper-frame; second, to remove the connecting-rod P; and, third, to raise the front end of the frame from the hooked projections $h$ of the cart.

In order that the connecting-rod may be easily removed, I make the crank-pin $w$ of the wheel B and the crank-pin $w'$ of the shaft E plain—that is, without any collars, keys, or other retainers at their outer ends—for the head of the fulcrum-screw $x$ will suffice to keep the rod in place, so that, on withdrawing this screw, the rod can be at once slipped off from the crank-pins.

Any one or more of the fingers M will readily yield to any local obstruction or irregularity, while the other fingers will remain in contact with the ground, so as to prevent the brush from forcing the dirt beneath the frame.

It is important that when the sweeper-frame is attached to the cart the shaft E should always occupy the same position in relation to the center of the driving-wheel B; hence the said shaft is adapted to the hooked projections $h\,h$ of the cart, and is the pivot on which the sweeper-frame is raised or lowered.

I claim as my invention—

1. The combination of the hooked or slotted projections $h\,h$ at the rear of the cart with a shaft, E, on the sweeper-frame.

2. The combination of the shaft E of the sweeper-frame and its crank-pin $w'$ with the crank-pin $w$ of the cart's driving-wheel, and with the slotted rod P and fulcrum $x$.

3. The combination of the slotted rod P, the removable fulcrum-pin $x$, and the plain crank-pins on the driving-wheel and shaft E, all as set forth.

4. The within-described sweeper-frame, consisting of two bars combined with and carrying the shaft E, belt-shafts F and $k$, and brush K, all as described.

5. The combination of the endless apron, the brush K, and fingers N, hung loosely to the frame, all substantially as specified.

6. The combination of the projecting arms D' of the sweeper-frame with the windlass $d$ on the cart and the two ropes or chains $t\,t$.

In testimony whereof I have signed my name to this specification in the presence of two subscribing witnesses.

HERBERT W. RICHARDSON.

Witnesses:
HERMANN MOESSNER,
HARRY SMITH.